United States Patent [19]

Morrone

[11] 4,042,100
[45] Aug. 16, 1977

[54] APPARATUS FOR ARRANGING ARTICLES

[75] Inventor: Ross Morrone, Lawrenceville, N.J.

[73] Assignee: Otto Niederer Sons, Inc., Pennington, N.J.

[21] Appl. No.: 709,675

[22] Filed: July 29, 1976

[51] Int. Cl.$^2$ .............................................. B65G 47/26
[52] U.S. Cl. ..................................... 198/446; 198/836
[58] Field of Search ............... 198/445, 446, 454, 533, 198/598, 636, 836

[56] References Cited

U.S. PATENT DOCUMENTS

| 791,243 | 5/1905 | Carlson | 198/446 |
|---|---|---|---|
| 2,183,433 | 12/1939 | Rheinstrom | 198/446 |
| 2,679,309 | 5/1954 | Reading | 198/446 |
| 2,731,128 | 1/1956 | Herold et al. | 198/446 |
| 2,941,650 | 6/1960 | Clinton | 198/446 |
| 3,139,176 | 6/1964 | Bliss | 198/728 |
| 3,185,187 | 5/1965 | Luther | 198/836 |
| 3,295,657 | 1/1967 | Snyder | 198/446 |
| 3,716,127 | 2/1973 | Loeffler | 198/446 |
| 3,854,568 | 12/1974 | Willsey | 198/446 |
| 3,874,494 | 4/1975 | Temming | 198/446 |

FOREIGN PATENT DOCUMENTS

| 1,359,601 | 3/1964 | France | 198/445 |
|---|---|---|---|
| 210,231 | 4/1957 | United Kingdom | 198/446 |

Primary Examiner—Evon C. Blunk
Assistant Examiner—Richard K. Thomson

Attorney, Agent, or Firm—John J. Kane; Frederick A. Zoda; Albert Sperry

[57] ABSTRACT

An apparatus for use with a conveying system for arranging articles which are positioned thereon in random locations into orderly rows to facilitate further processing through the conveyor system which comprises a plurality of channeling devices such as divider walls and the like positioned extending parallel to the direction of movement of the conveyor and adjacent the upper surface of the conveyor, a plurality of separator members or elongated members extended downwardly adjacent the front edges of the channeling devices being adapted for movement with respect to the conveyor to aid in separating groups of eggs or other articles into the areas or paths between the channeling dividers, the separator members being connected at the upper end thereof to a movable carriage plate extending transverse with respect to the conveyor, the carriage plate including a follower member thereon selectively engageable with a cam member for allowing movement of the carriage plate to cause movement of the downardly extending separator members, the cam members being operable to control positioning of the follower is mounted upon a rotatable gear member which is engaged with the surface of the conveyor to drive the gear member to rotate, also including a biasing member such as a spring or the like urging the follower into abutment with the cam member to maintain operational contact therebetween.

6 Claims, 7 Drawing Figures

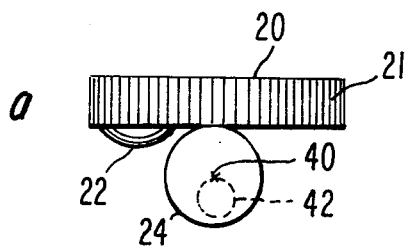
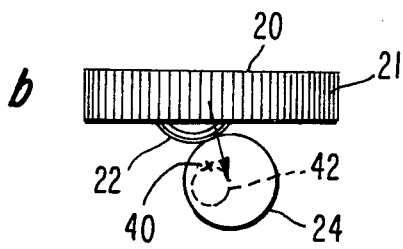
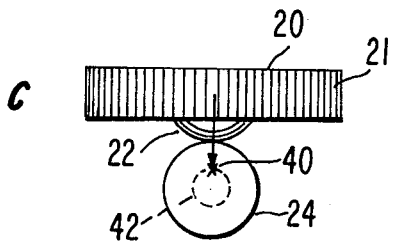
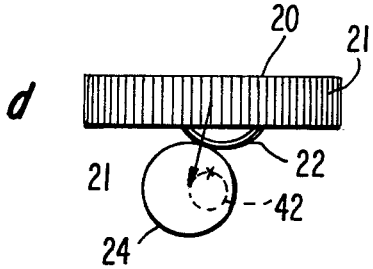
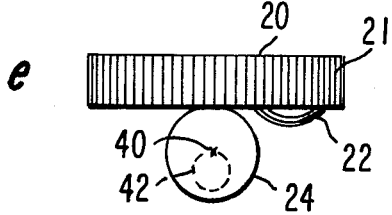
Fig. 3
Fig. 5
Fig. 4

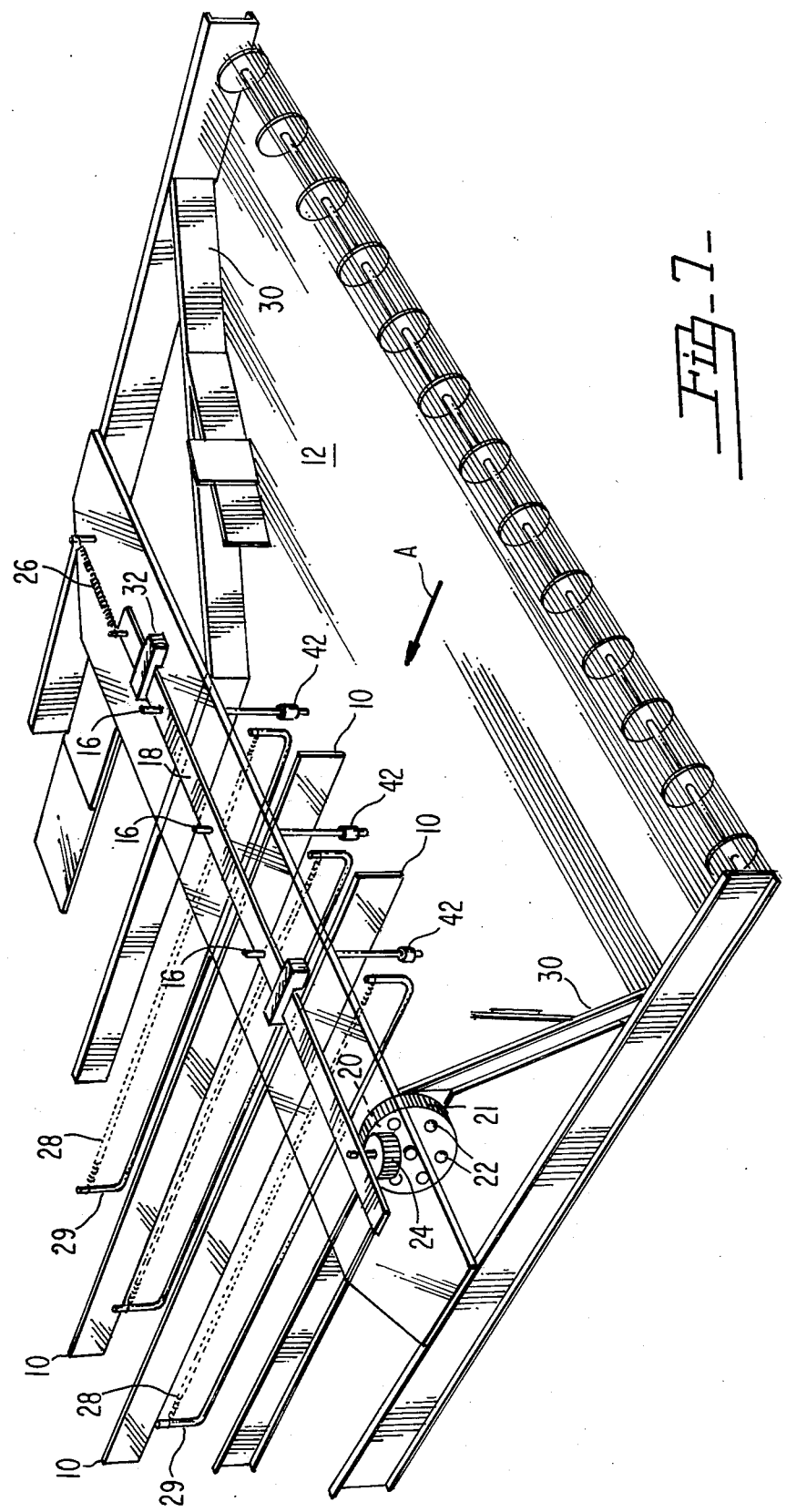

APPARATUS FOR ARRANGING ARTICLES

BACKGROUND OF THE INVENTION

1. Field Of The Invention

The present invention deals with conveyor systems which carry groups of randomly positioned articles such as eggs and the like. Normally a conveyor system is used to transfer eggs from a henhouse to processing stations for cleaning, candling, grading and packing. In order to process these eggs or other articles it is desirable to orient the individual units into orderly rows upon the conveyor belt.

This step in the egg processing system presents unusual difficulties due to the piling together of eggs which tend to block the paths within the channeling systems and, as such, cause stoppage of the operation of the accumulator or article arranging apparatus. The present invention presents a novel device for placing articles in orderly rows without damage or breakage thereto while at the same time preventing blockage of the channeling paths.

2. Description Of The Prior Art

Many designs have been utilized for aligning or arranging articles traveling upon a conveyor such as the cookie aligning apparatus of U.S. Pat. No. 3,295,657. Other patents have utilized similar systems for use with other articles such as bakery goods or bottles such as U.S. Pat. Nos. 3,613,860 and 3,710,918. U.S. Pat. Nos. 3,139,176 and 3,716,127 show channeling devices for use with egg conveyor systems.

The prior art systems shown in the above patents and used in the field of egg processing have included many complex mechanical movements for causing the quick and efficient separation of eggs traveling upon the conveyor in random locations and orientations. The present apparatus provides a system which is simple in design and thereby eliminates many of the problems of maintenance present heretofore. The approximate circular movement of the separator means or elongated members serves to divide the eggs into the channels between the channeling devices in a quick manner which minimizes breakage or damage to the eggs or other articles. Also the direct mechanical linkage between the conveyor surface and the movable separator means facilitates overall system coordination and efficiency.

SUMMARY OF THE INVENTION

The present invention includes a plurality of channeling devices positioned above the conveyor to extend parallel with respect to the movement direction of the conveyor. The channeling devices receive eggs randomly positioned as they travel upon the conveyor and then places these eggs in orderly rows to facilitate the processing. To aid in the division of the eggs between the channeling paths a plurality of separator means such as elongaged members are positioned adjacent the front edges of the channeling devices or dividing walls and are operable to be movable such as to urge the eggs into rows or channeling paths on the sides of the elongated members.

The plurality of separators are secured at the upper ends thereof to a carriage plate which extends transverse with respect to the conveyor. The carriage plate is movably mounted and includes a cam follower secured to one end thereof. The cam follower is adapted to be urged into contact with a cam means for controlling movement of the carriage plate and similarly for controlling movement of the separator means for dividing the eggs between the channels. In order to urge the follower into contact with the cam a biasing means such as a spring or the like may be secured to the carriage plate to exert a constant pressure thereby facilitating following of the cam.

The present apparatus includes a rotatable gear means which is positioned in engagement with the conveyor thereby being operable to rotate responsive to movement of the conveyor. The cam means described above is preferably integral with or secured to the gear means such that when the conveyor is in operation the gear means will rotate and the cams will selectively be brought into contact with the follower which is further secured to the carriage plate. In this manner, during movement of the conveyor, the gear means will be rotated thereby causing the cams to transfer slight movement to the follower and consequently causing the carriage plate and separator means to be moved slightly. Thus, during operation of the conveyor, the separator means or elongated members will be moving slightly in an approximately round pattern.

To minimize breakage of eggs and to facilitate separation into channels, the channeling devices or divider walls are preferably formed of pliable material. In particular, alternating walls of the channeling devices may be configured as spring-like devices which are chosen sufficiently pliable to prevent breakage of the egg shells. The present apparatus may also include deflector walls for gathering the eggs in the center section of the conveyor belt to facilitate arranging.

It is an object of the present invention to provide an apparatus for orderly arranging articles positioned upon a conveyor at random locations.

It is an object of the present invention to provide a simple and efficient system to prevent the breakage of fragile articles when arranging the articles into orderly rows upon the conveyor.

It is an object of the present invention to provide an apparatus for arranging articles which is simple in design and without maintenance difficulties inherent with heretofor complex mechanical apparatus.

It is a further object of the present invention to provide an apparatus for arranging articles which provides direct mechanical coupling between movement of the conveyor and operation of the article separating devices.

It is an object of the present invention to provide a plurality of eggs channeling devices which are pliable to prevent egg shell breakage.

It is an object of the present invention to provide an apparatus for arranging articles which includes vertically extending rod-like members to separate accumulated groupings of eggs into orderly channels without damage thereto and without causing blockages within the channels of the apparatus.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a top view of the apparatus shown in FIG. 1 showing the operation of the cam and follower system;

FIG. 4 is a top plan view of the carriage and cam and follower mechanism of the apparatus shown in FIG. 1;

FIG. 5 is an end view of the mechanism shown in FIG. 4;

FIG. 6 is an end view of the apparatus as shown in FIG. 1; and

FIG. 7 is a front perspective view of FIG. 2.

DETAILED DESCRIPTION OF THE PREFERRED EMBODIMENT

Figure 1:
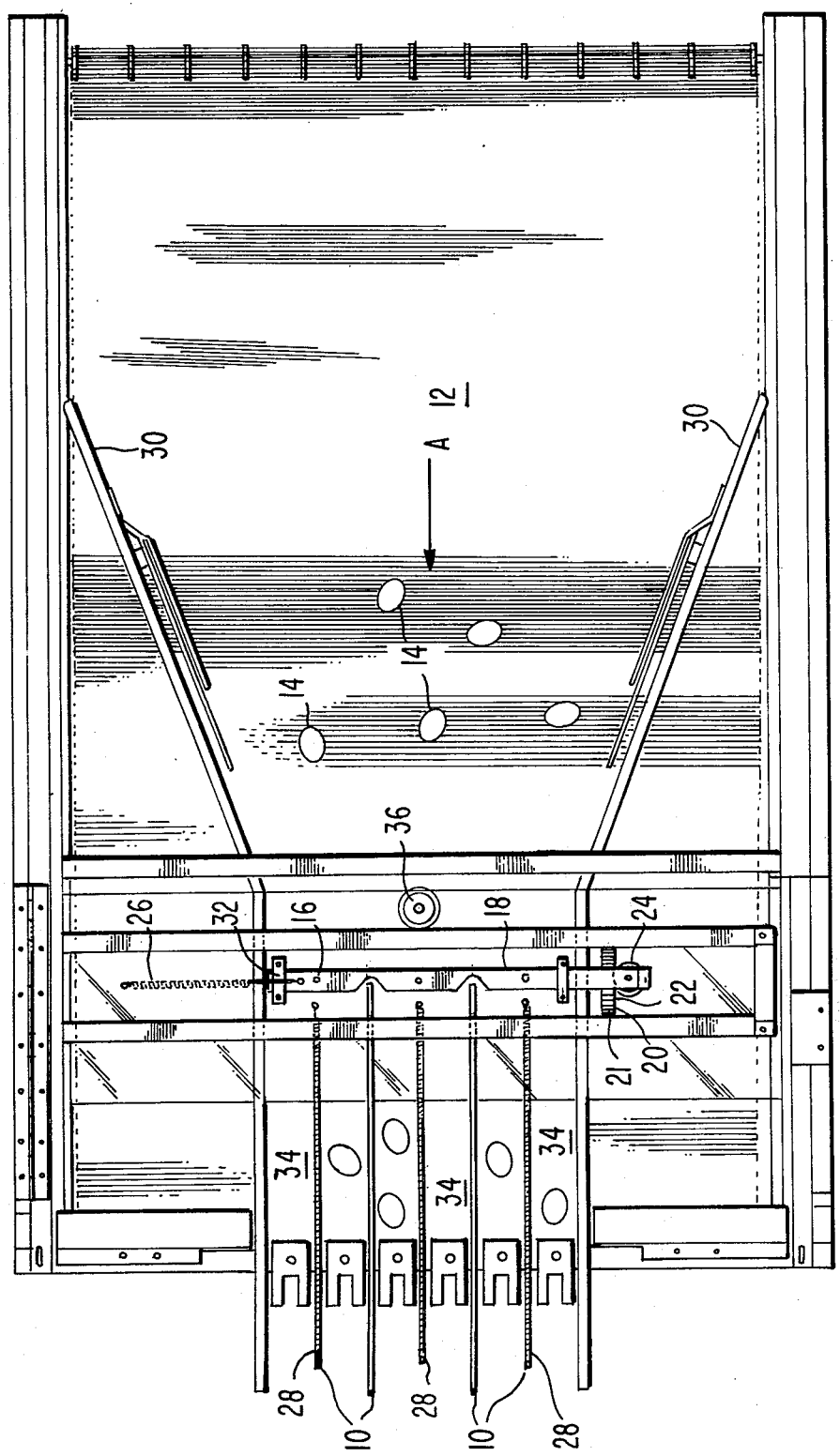
FIG. 1 is a top plan view of an embodiment of the apparatus of the present invention.

Operation of conveyor systems carrying discrete articles often requires the orderly positioning of the articles prior to certain processing steps. The present apparatus is particularly adaptable for use with conveyor systems operable for transferring eggs from one processing station to another. The present invention includes a plurality of channeling devices 10 which may be divider walls, longitudinally extending rods or similar springs. These channeling walls should be positioned immediately above the conveyor 12 and extending longitudinally with respect thereto for receiving the randomly positioned eggs or other articles 14 and placing them in orderly rows within the paths between the channeling dividers.

Adjacent the forward edges of some of the divider walls may be positioned downwardly extending elongated members such as separator means 16 adapted to be moved in a regular fashion to aid in the separation of bunching of eggs or other discrete articles. The separator means may be secured at the upper ends thereof to a laterally extending carriage plate 18 which is movably mounted within a plurality of clamps or clamping means 32.

A rotatable gear means 20 may be positioned in a manner such that the gear teeth 21 thereof are engaged with the conveyor 12 so that whenever the conveyor is moving the rotatable gear means 20 will be caused to rotate. Positioned preferably upon the side surfaces of the rotatable gear means 20 is a cam means such as hemispherical protrusions 22. The cam means 22 is selectively engageable with a follower 24. The following 24 may be movably secured to the carriage plate 18. To facilitate contact between the follower 24 and the cam means 22 a biasing means such as a spring 26 may be positioned between the movable carriage plate 18 and a stationary section of the frame of the conveyor system.

In order to facilitate the orderly positioning of fragile discrete items such as eggs and the like, the channeling devices 10 should be chosen such that the walls thereof will not present rigid surfaces. This structure may be achieved by forming the dividing walls of pliable material. Another manner would be to allow the channeling devices 10 to be formed from spring devices such as spring supports 29 having a C-shaped cross-section to carry the spring dividers 28 thereon. Also, the hard surfaced divider walls may be loosely mounted within the mounting holes to allow for a slight lateral movement whenever an egg contacts the surface to minimize breakage of the egg shells. The present invention may also include side deflector walls 30 adapted to minimize the effective width of the conveyor 12 in order to minimize the number of channeling paths 34 within which the eggs or other articles 14 will be positioned.

Figure 2:
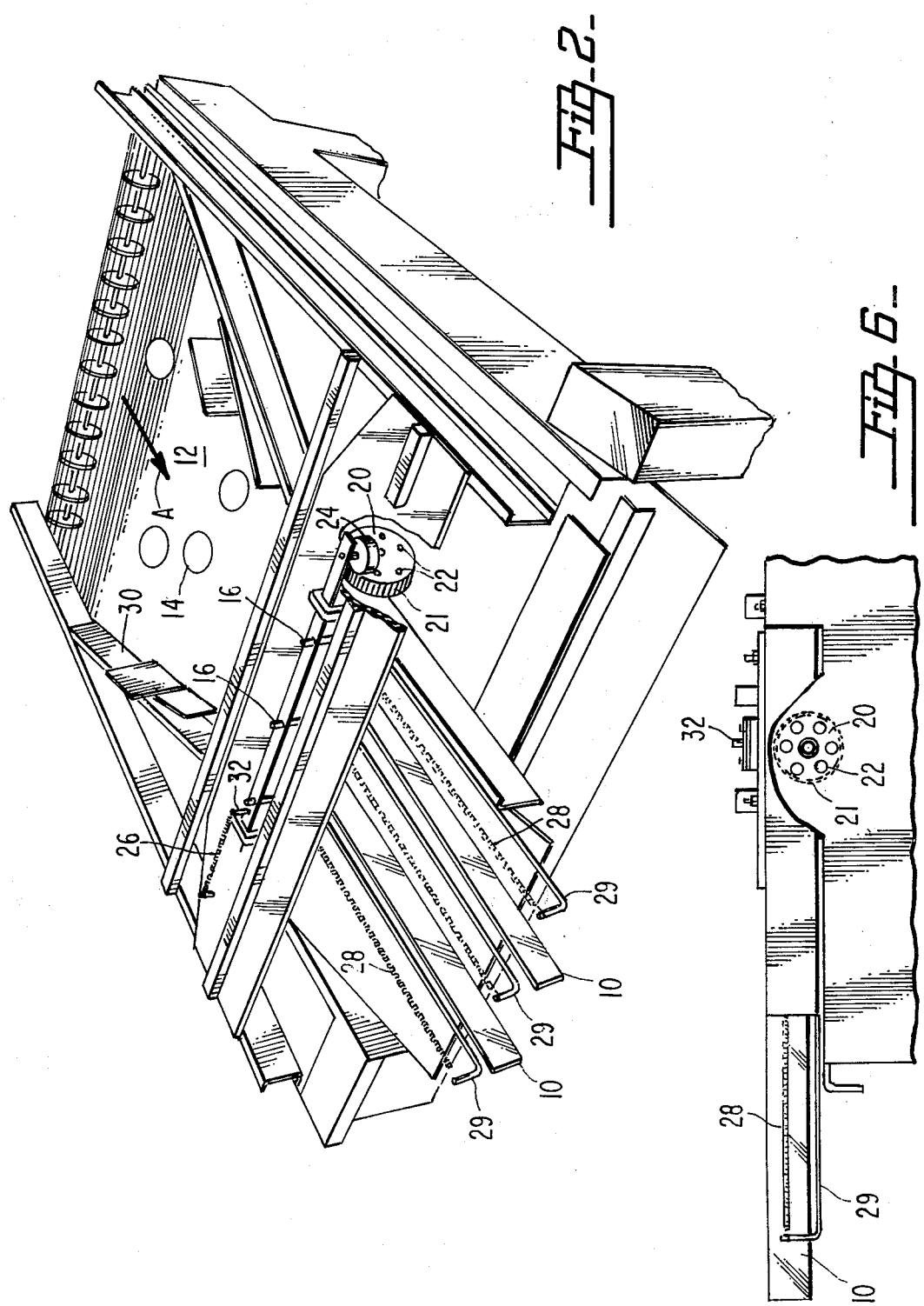
FIG. 2 is a perspective view of an embodiment of the present invention.

The present invention is particularly adaptable for use with a conveyor which is formed as a plurality of laterally extending wire gratings to facilitate engagement between the rotatable gear means 20 and the surface of the conveyor. In this manner rotation of the gear means 20 will only occur when the conveyor 12 is moving. The direction of movement of the conveyor 12 is shown by the arrows A in FIGS. 1 and 2. The effective width of the conveyor is narrowed by the deflecting walls 30 which therefore serves to increase the density or bunching of the eggs or other articles 14 as they approach the front edges of the divider walls 10. A rotatable mounted dividing wheel 36 may be included as shown in FIG. 1 to provide a preliminary point of separation of the groupings of eggs traveling toward the channeling devices 10. To facilitate arranging of the eggs 14, the separator means 16 may be located adjacent the front edges of at least some of the divider walls. The separator members are adapted to move in an approximately round path in the horizontal plane to thereby urge the groupings of eggs to separate into the channeling paths 34. Movement through this approximately circular path should be slow in order to prevent breakage of the eggs. The magnitude of force exerted by the separating means 16 upon the randomly positioned eggs is directly proportional to the gear size and cam and follower relationship.

As the gear 20 rotates the generally hemispherical cams 22 will selectively engage the follower 24. FIG. 5A shows the cam immediately prior to engagement with the follower and FIG. 5B shows the cam during the first half of the engagement duration. FIG. 5C shows the position of the cam and follower during the second half of the duration of engagement. These figures show the follower pin 38 upon which the follower 24 is mounted and thereby secured to the carriage plate 18. FIG. 5 also shows the path of movement of the pin axis 40 of the follower pin 38. To further describe the interaction between the cam and follower, FIGS. 3A, 3B, 3C, 3D and 3E show the cam and follower positioning at several points within the cycle. The pin axis 40 is shown in these figures moving through the dotted circular path 42. This is a similar path to the approximately round circular path 42 shown in FIG. 2 which is followed by the members 16 during contact between follower 24 and cams 22. A close study of FIGS. 3 and 5 as well as the biasing means 26 shown in FIG. 4 will illustrate the path of movement 42 which shall be taken by the pin axis 40 as well as the bottom ends of the separator means or elongated members 16. FIG. 3B will show the follower 24 to be moved outward by the cam 22 as well as to the right by the interaction between the outward force of the cam 22 and the inwardly directed bias of the spring 26. At exactly the mid-point of the duration of the cam profile, the cam and follower will achieve the configuration shown in FIG. 3C. At this point the axis 40 of the pin 38 and the separator means 16 will be at the outermost point of the rotational path 42. FIG. 3D shows the positioning of the cam 22 and follower 24 during the latter half of the cam profile duration. In this configuration the pin axis 40 and the separator means 16 will be at the point of maximum movement in the leftward or rearward direction.

FIG. 5 illustrates the loose fitting tolerance desirable between the clamping means 32 and the outside surface of the carriage plate 18. By this configuration the lower ends of the separator means 16 will be free to move transverse and parallel with respect to the conveyor as well as a slight upward movement caused by the rocking fully illustrated by FIGS. 5B and 5C. As the follower 24 is urged to the maximum forward position and the maximum rearward position the slight rotational movement in the upwardly extending plane will cause a minor but perceptible amount of vertical movement of the lower end of the separator means 16.

It should be appreciated that the walls which comprise the channeling devices or dividers 10 may be chosen of any configuration which will serve to divide the upper surface of the conveyor 12 into channeling paths 34. It is preferable to form these divider walls from loosely mounted wall structures, springs or rods such that blockage of the channels will be prevented.

While particular embodiments of this invention have been shown in the drawings and described above, it will be apparent, that many changes may be made in the form, arrangement and positioning of the various elements of the combination. In consideration thereof it should be appreciated that preferred embodiments of this invention disclosed herein are intended to be illustrative only and not intended to limit the scope of the invention.

I claim:

1. An apparatus for arranging eggs and like articles which are positioned at random locations upon a conveyor by placing the eggs in orderly rows thereon, which comprises:
   a. a plurality of channeling devices above the conveyor extending parallel with respect thereto to receive randomly positioned eggs and arrange them in orderly rows;
   b. a rotatable gear means in engagement with the conveyor, said gear means being operable to rotate responsive to movement of the conveyor;
   c. a cam means attached to said gear means;
   d. a movably mounted carriage plate positioned above said channeling devices;
   e. a cam follower movably secured to said carriage plate and biased into engagement with said cam means on said gear means;
   f. biasing means attached to said carriage plate to urge said follower secured thereto into engagement with said cam means; and
   g. a plurality of separator means secured to said carriage plate and extending downward therefrom adjacent the front ends of said channeling devices, said separator means adapted to move slightly in the horizontal plane to aid in the dividing of oncoming randomly positioned eggs into rows within said channeling device.

2. The apparatus as defined in claim 1 wherein said channeling device comprises divider walls positioned across the upper surface of the conveyor and extending parallel with respect to the direction of movement thereof.

3. The apparatus as defined in claim 1 wherein said channeling devices include a plurality of springs extending parallel with respect to the direction of movement of the conveyor and adjacent the upper surface thereof.

4. The apparatus as defined in claim 1 wherein said biasing means comprises a spring secured at one end to said carriage plate and at the other end to a stationary portion of the frame of the conveyor assembly.

5. The apparatus as defined in claim 1 wherein said cam means comprises approximately hemispherical protrusions on the side surface of said rotatable gear means.

6. The apparatus as defined in claim 1 wherein said separator means is adapted to include slight movement in the vertical direction.

* * * * *